United States Patent
Smith et al.

(10) Patent No.: US 10,846,645 B2
(45) Date of Patent: Nov. 24, 2020

(54) SYSTEMS AND METHODS FOR REAL-TIME ORDER DELAY MANAGEMENT

(71) Applicant: WAL-MART STORES, INC., Bentonville, AR (US)

(72) Inventors: Austin Lee Smith, Burlingame, CA (US); Vidyanand Krishnan, Sunnyvale, CA (US); Michael Gilbert Ebener, San Francisco, CA (US); Pratosh Deepak Rajkhowa, Bangalore (IN); Arnon Katz, San Mateo, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 543 days.

(21) Appl. No.: 15/582,319

(22) Filed: Apr. 28, 2017

(65) Prior Publication Data
US 2018/0315003 A1 Nov. 1, 2018

(51) Int. Cl.
*G06Q 30/00* (2012.01)
*G06Q 10/08* (2012.01)
*G06Q 30/06* (2012.01)

(52) U.S. Cl.
CPC ....... *G06Q 10/083* (2013.01); *G06Q 30/0635* (2013.01)

(58) Field of Classification Search
CPC .................................................. G06Q 30/00
See application file for complete search history.

(56) References Cited

U.S. PATENT DOCUMENTS

| 6,246,998 B1 | 6/2001 | Matsumori |
| 7,147,154 B2 | 12/2006 | Myers et al. |

(Continued)

FOREIGN PATENT DOCUMENTS

| CN | 101778045 A | 7/2010 |
| CN | 101964799 A | 2/2011 |

(Continued)

OTHER PUBLICATIONS

Shama, Sanjay, A proposed hybrid Storage assignment framework: A case study, International Journal of productivity and Performance Management, dated Jul. 2015. (Year: 2015).*

(Continued)

*Primary Examiner* — Mark A Fadok
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of receiving a plurality of orders for items for sale at a store, determining a picking start time, a picking end time, and an order completion time for each order based on at least one of: (1) availabilities of one or more associates of the store to collect the items of the order at the store or (2) a dynamic pick time estimation for the order, assigning the order to a first associate of the store for collection of the items of the order at the store, and automatically adjusting, in real-time, the picking start time and the picking end time without adjusting the order completion time for each order.

20 Claims, 5 Drawing Sheets

400

405 – Receiving a plurality of orders from a plurality of customers.

410 – Determining an order completion time for each order.

415 – Coordinating displaying the order completion time for each order on an electronic device of the customer.

420 – Assigning the order to one associate of one or more associates of the store for collection of the one or more items of the order.

425 – Automatically updating, in real-time, the order completion time.

(56) References Cited

U.S. PATENT DOCUMENTS

| | | |
|---|---|---|
| 7,295,990 B1 | 11/2007 | Braumoeller et al. |
| 7,747,543 B1 | 6/2010 | Braumoeller et al. |
| 7,949,686 B2 | 5/2011 | Chang et al. |
| 8,005,761 B1 | 8/2011 | Braumoeller et al. |
| 8,121,876 B1 | 2/2012 | Braumoeller et al. |
| 8,201,737 B1 | 6/2012 | Palacios Durazo et al. |
| 8,401,914 B1 | 3/2013 | Kim |
| 8,428,988 B1 | 4/2013 | Braumoeller et al. |
| 8,732,028 B2* | 5/2014 | Napper .............. G06Q 20/3224 705/26.1 |
| 8,818,836 B1 | 8/2014 | Braumoeller et al. |
| 9,147,208 B1 | 9/2015 | Argue et al. |
| 9,466,045 B1 | 10/2016 | Kumar |
| 9,470,532 B2 | 10/2016 | Pellow et al. |
| 9,626,709 B2 | 4/2017 | Koch et al. |
| 10,127,514 B2 | 11/2018 | Napoli |
| 10,336,540 B2* | 7/2019 | Gravelle ................. B65G 1/04 |
| 10,572,932 B2* | 2/2020 | Kumar ............... G06Q 30/0639 |
| 10,657,580 B2* | 5/2020 | Kumar ............... G06Q 30/0635 |
| 2002/0198756 A1 | 12/2002 | Ghaisas et al. |
| 2003/0033177 A1 | 2/2003 | MacGonigle et al. |
| 2003/0177072 A1 | 9/2003 | Bared |
| 2003/0204431 A1* | 10/2003 | Ingman ............ G06Q 10/06311 705/7.16 |
| 2004/0010437 A1 | 1/2004 | Kiran et al. |
| 2004/0068443 A1 | 4/2004 | Hopson et al. |
| 2004/0210621 A1 | 10/2004 | Antonellis |
| 2005/0278062 A1 | 12/2005 | Janert et al. |
| 2007/0174144 A1 | 7/2007 | Borders et al. |
| 2007/0244758 A1 | 10/2007 | Xie |
| 2007/0250355 A1 | 10/2007 | Leet et al. |
| 2009/0048878 A1 | 2/2009 | Metcalf |
| 2009/0157472 A1 | 6/2009 | Burazin et al. |
| 2009/0281921 A1 | 11/2009 | Foster et al. |
| 2010/0010902 A1 | 1/2010 | Casey |
| 2010/0287025 A1 | 11/2010 | Fletcher et al. |
| 2012/0023034 A1 | 1/2012 | Lynch et al. |
| 2012/0123674 A1 | 5/2012 | Perks et al. |
| 2012/0150340 A1 | 6/2012 | Suess et al. |
| 2012/0330458 A1 | 12/2012 | Weiss |
| 2013/0030955 A1 | 1/2013 | David |
| 2013/0231990 A1 | 9/2013 | Munjal et al. |
| 2013/0332273 A1 | 12/2013 | Gu et al. |
| 2013/0346204 A1 | 12/2013 | Wissner-Gross et al. |
| 2014/0003727 A1 | 1/2014 | Lortz et al. |
| 2014/0040075 A1 | 2/2014 | Perry et al. |
| 2014/0095350 A1 | 4/2014 | Carr et al. |
| 2014/0136255 A1* | 5/2014 | Grabovski ...... G06Q 10/063112 705/7.14 |
| 2014/0156553 A1 | 6/2014 | Leach et al. |
| 2014/0207615 A1 | 7/2014 | Li et al. |
| 2014/0222623 A1* | 8/2014 | Napper .............. G06Q 30/0635 705/26.81 |
| 2014/0266616 A1 | 9/2014 | Jones et al. |
| 2014/0278627 A1 | 9/2014 | Grabovski et al. |
| 2014/0279294 A1 | 9/2014 | Field-Darragh |
| 2014/0324491 A1 | 10/2014 | Banks et al. |
| 2014/0336814 A1 | 11/2014 | Moore et al. |
| 2014/0351101 A1 | 11/2014 | Danelski |
| 2014/0379529 A1 | 12/2014 | Agasti et al. |
| 2015/0051994 A1 | 2/2015 | Ward et al. |
| 2015/0170256 A1 | 6/2015 | Pettyjohn |
| 2015/0206093 A1 | 7/2015 | Trew et al. |
| 2015/0242918 A1 | 8/2015 | McCarthy |
| 2015/0278759 A1 | 10/2015 | Harris et al. |
| 2015/0310447 A1 | 10/2015 | Shaw |
| 2016/0012391 A1 | 1/2016 | Burnett |
| 2016/0055452 A1 | 2/2016 | Qin |
| 2016/0063604 A1 | 3/2016 | Shaffer et al. |
| 2016/0071056 A1 | 3/2016 | Ellison et al. |
| 2016/0092969 A1 | 3/2016 | Gopalsamy et al. |
| 2016/0148300 A1 | 5/2016 | Carr et al. |
| 2016/0171592 A1 | 6/2016 | Pugh et al. |
| 2016/0203543 A1* | 7/2016 | Snow ................. G06Q 30/0635 705/7.15 |
| 2016/0223339 A1 | 8/2016 | Pellow et al. |
| 2016/0247113 A1 | 8/2016 | Rademaker |
| 2016/0253740 A1 | 9/2016 | Goulart |
| 2016/0258762 A1 | 9/2016 | Taylor et al. |
| 2016/0260158 A1 | 9/2016 | High et al. |
| 2016/0299782 A1 | 10/2016 | Jones et al. |
| 2016/0314429 A1 | 10/2016 | Gillen |
| 2016/0321605 A1 | 11/2016 | Maifeld et al. |
| 2016/0350837 A1 | 12/2016 | Williams et al. |
| 2017/0024789 A1 | 1/2017 | Frehn et al. |
| 2017/0069013 A1 | 3/2017 | Castillo |
| 2017/0200108 A1 | 7/2017 | Au et al. |
| 2017/0213186 A1 | 7/2017 | Grifoni |
| 2017/0228701 A1 | 8/2017 | Wosk et al. |
| 2017/0278047 A1 | 9/2017 | Welty et al. |
| 2017/0285648 A1 | 10/2017 | Welty et al. |
| 2017/0369245 A1 | 12/2017 | Suemitsu et al. |
| 2018/0121992 A1 | 5/2018 | Agarwal et al. |
| 2018/0137452 A1 | 5/2018 | Khartravath et al. |
| 2018/0182054 A1* | 6/2018 | Yao ........................ G06Q 50/28 |
| 2018/0218311 A1* | 8/2018 | Kumar ................. G01C 21/206 |
| 2018/0300800 A1* | 10/2018 | Rajkhowa .......... G06Q 30/0635 |
| 2018/0314991 A1 | 11/2018 | Grundberg |
| 2018/0342031 A1 | 11/2018 | Tada et al. |

FOREIGN PATENT DOCUMENTS

| | | |
|---|---|---|
| CN | 102137100 A | 7/2011 |
| CN | 102377629 A | 3/2012 |
| DE | 102012100354 | 7/2013 |
| WO | 2016119747 A1 | 8/2016 |
| WO | 2016119749 | 8/2016 |

OTHER PUBLICATIONS

Matusiak, Marek et al, "Data-Driven warehouse optimization: deploying skills of order pickers", Finnish Centre of Excellence in Generic Intelligent Machines Research, dated Jun. 29, 2015. (Year: 2015).*

U.S. Appl. No. 15/339,808, filed Oct. 31, 2016.

ISR for corresponding Int'l Application No. PCT/CN2016/072791, dated Apr. 28, 2016.

* cited by examiner

SYSTEMS AND METHODS FOR REAL-TIME ORDER DELAY MANAGEMENT

TECHNICAL FIELD

This disclosure relates generally to systems and methods for real-time management of order changes of delivery and/or pick up orders.

BACKGROUND

Many customers of retail or grocery stores now desire the convenience of having their orders delivered to their homes and/or picking up their already-collected orders at a designated area of the store. These orders are often made by the customers online using a website or mobile application for the store. If, however, the customer has a narrow window of time in which to pick up the order or be at home for delivery of the order, and/or the store has numerous orders to fulfill, a problem with these online orders is providing accurate order completion times to the customer when the customer makes the order on the website or mobile application.

BRIEF DESCRIPTION OF THE DRAWINGS

To facilitate further description of the embodiments, the following drawings are provided in which.

Figure 1:
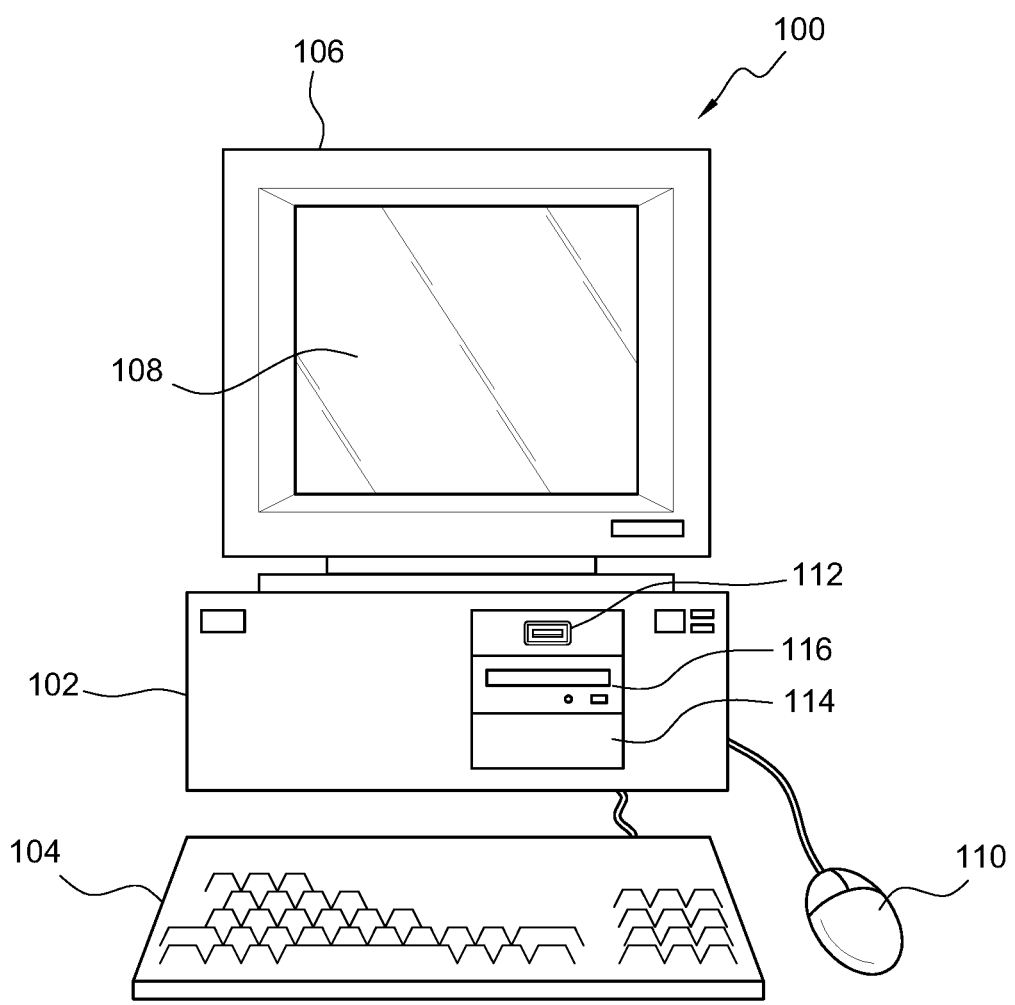
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform an act of receiving a plurality of orders from a plurality customers. Each order of the plurality of orders can comprise one or more items for sale at a store. The one or more storage modules can be further configured to run on the one or more processing modules and perform an act of, for each order of the plurality of orders from each customer of the plurality of customers, determining an order completion time based on at least one of: (1) availabilities of one or more associates of the store to collect the one or more items of the order at the store or (2) a dynamic pick time estimation for the order. The one or more storage modules can be further configured to run on the one or more processing modules and perform an act of, for each order of the plurality of orders from each customer of the plurality of customers, coordinating displaying the order completion time on an electronic device of the customer. The one or more storage modules can be further configured to run on the one or more processing modules and perform an act of, for each order of the plurality of orders from each customer of the plurality of customers, assigning the order to one associate of the one or more associates of the store for collection of the one or more items of the order at the store. The one or more storage modules can be further configured to run on the one or more processing modules and perform an act of, for each order of the plurality of orders from each customer of the plurality of customers, automatically updating, in real-time, the order completion time based on at least one of: (1) automatically reassigning the order to a different associate of the one or more associates or (2) the one associate of the one or more associates becoming available earlier than previously estimated when determining the order completion time for the order.

Various embodiments include a method. The method can include receiving a plurality of orders from a plurality customers. Each order of the plurality of orders can comprise one or more items for sale at a store. The method also can comprise, for each order of the plurality of orders from each customer of the plurality of customers, determining an order completion time based on at least one of: (1) availabilities of one or more associates of the store to collect the one or more items of the order at the store or (2) a dynamic pick time estimation for the order. The method also can comprise, for each order of the plurality of orders from each customer of the plurality of customers, coordinating displaying the order completion time on an electronic device of the customer. The method also can comprise, for each order of the plurality of orders from each customer of the plurality of customers, assigning the order to one associate of the one or more associates of the store for collection of the one or more items of the order at the store. The method also can comprise, for each order of the plurality of orders from each customer of the plurality of customers, automatically updating, in real-time, the order completion time based on at least one of: (1) automatically reassigning the order to a different associate of the one or more associates or (2) the one associate of the one or more associates becoming available earlier than previously estimated when determining the order completion time for the order.

Additional embodiments can include a system. The system can include one or more processing modules and one or more non-transitory storage modules storing computing instructions configured to run on the one or more processing modules. The one or more storage modules can be configured to run on the one or more processing modules and perform an act of receiving a plurality of orders from a plurality customers. Each order of the plurality of orders can comprise one or more items for sale at a store. The one or more storage modules can be further configured to run on the one or more processing modules and perform an act of, for each order of the plurality of orders from each customer of the plurality of customers, determining a picking start time, a picking end time, and an order completion time based on at least one of: (1) availabilities of one or more associates of the store to collect the one or more items of the order at the store or (2) a dynamic pick time estimation for the order. The one or more storage modules can be further configured to run on the one or more processing modules and perform an act of, for each order of the plurality of orders from each customer of the plurality of customers. The one or more storage modules can be further configured to run on the one or more processing modules and perform an act of, for each order of the plurality of orders from each customer of the plurality of customers, coordinating displaying of the order completion time on an electronic device of the customer. The one or more storage modules can be further configured to run on the one or more processing modules and perform an act of, for each order of the plurality of orders from each customer of the plurality of customers, assigning the order to one associate of the one or more associates of the store for collection of the one or more items of the order at the store. The one or more storage modules can be further configured to run on the one or more processing modules and perform an act of, for each order of the plurality of orders from each customer of the plurality of customers, automatically adjusting, in real-time, the picking start time and the picking end time without adjusting the order completion time based on at least one of: (1) automatic reassigning the order to a different associate of the one or more associates or (2) the one associate of the one or more associates becoming available earlier than previously estimated when determining the order completion time for the order.

Figure 2:
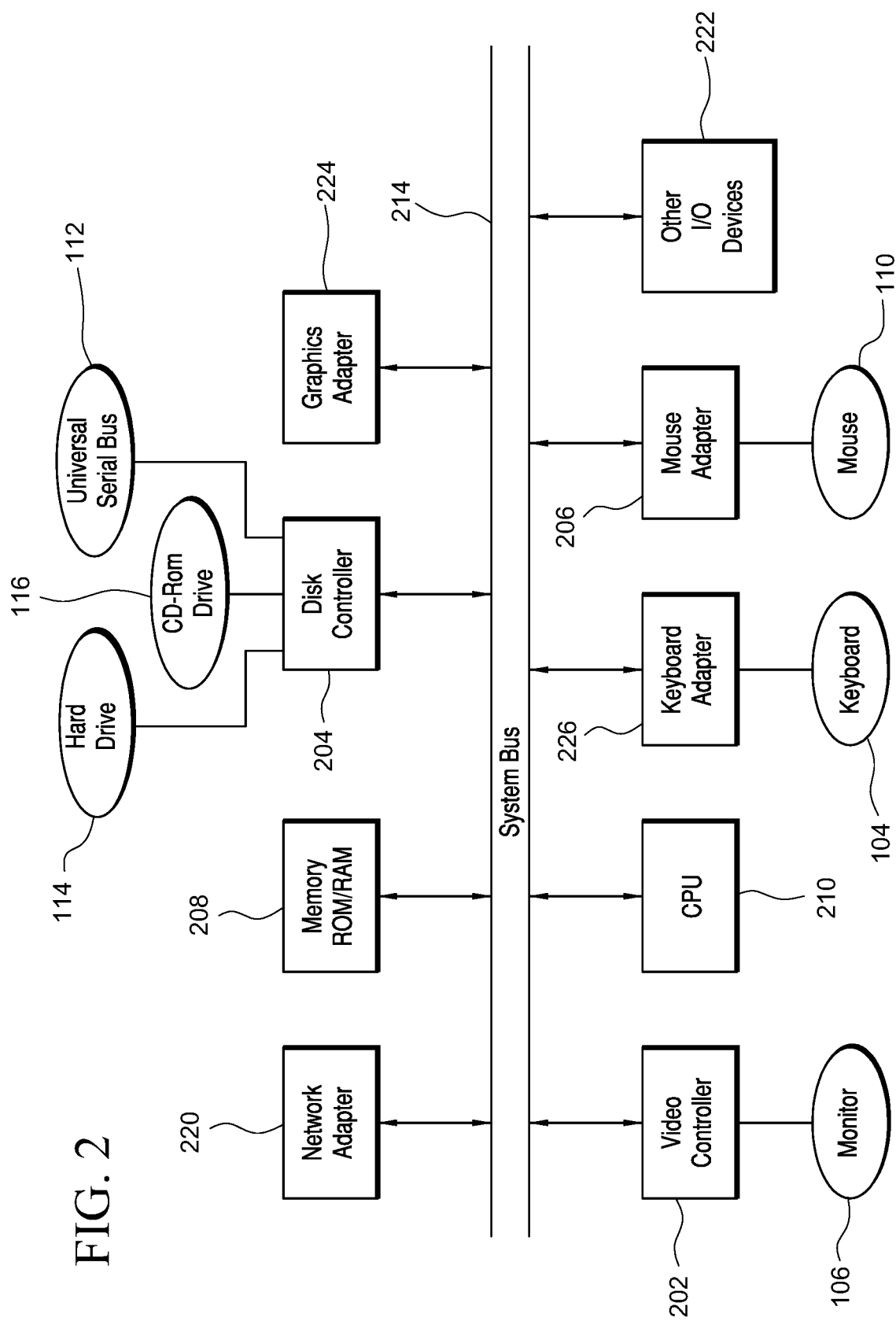
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc.

In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
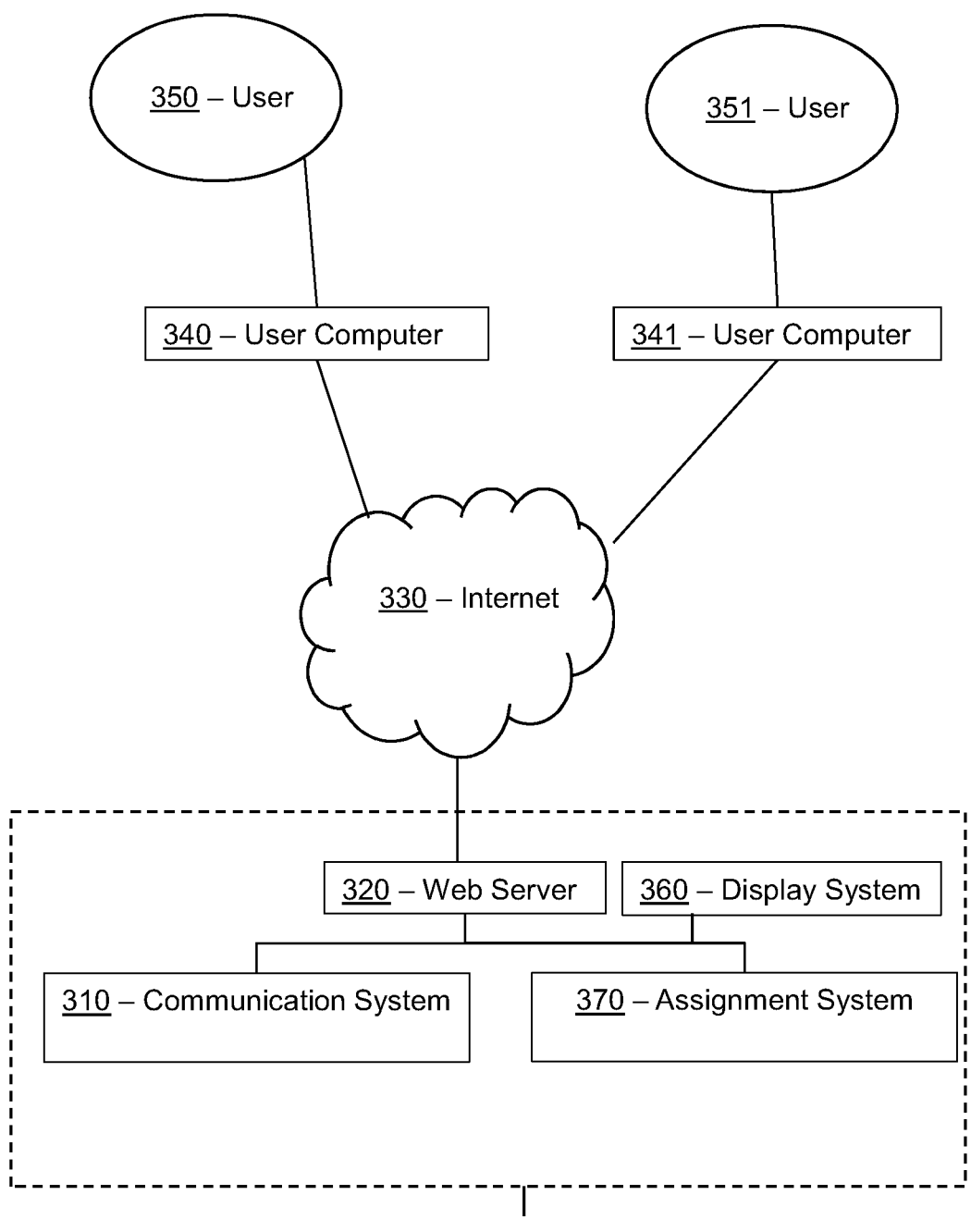
FIG. 3 illustrates a representative block diagram of a system, according to an embodiment.

Turning ahead in the drawings, FIG. 3 illustrates a block diagram of a system 300 that can be employed for real-time order delay management, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a communication system 310, a web server 320, a display system 360, and an assignment system 370. Communication system 310, web server 320, display system 360, and/or assignment system 370 can each be a computer system, such as computer system 100 (FIG. 1), as described above, and can each be a single computer, a single server, or a cluster or collection of computers or servers, or a cloud of computers or servers. In another embodiment, a single computer system can host each of two or more of communication system 310, web server 320, display system 360, and/or assignment system 370. Additional details regarding communication system 310, web server 320, display system 360, and assignment system 370 are described herein.

In many embodiments, system 300 also can comprise user computers 340, 341. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce web site that allows users to browse and/or search for products, to add products to an electronic shopping cart, and/or to purchase products, in addition to other suitable activities.

In many embodiments, communication system 310, web server 320, display system 360, and/or assignment system 370 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) communication system 310, web server 320, display system 360, and/or assignment system 370 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of communication system 310, web server 320, display system 360, and/or assignment system 370. In a similar manner, the processing module(s) and the memory storage module(s) can be local and/or remote to each other.

In many embodiments, communication system 310, web server 320, display system 360, and/or assignment system 370 can be configured to communicate with one or more user computers 340 and 341. In some embodiments, user computers 340 and 341 also can be referred to as customer computers. In some embodiments, communication system 310, web server 320, display system 360, and/or assignment system 370 can communicate or interface (e.g., interact) with one or more customer computers (such as user computers 340 and 341) through a network or internet 330. Internet 330 can be an intranet that is not open to the public. Accordingly, in many embodiments, communication system 310, web server 320, display system 360, and/or assignment system 370 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, communication system 310, web server 320, display system 360, and/or assignment system 370 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between communication system 310, web server 320, display system 360, assignment system 370, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 4:
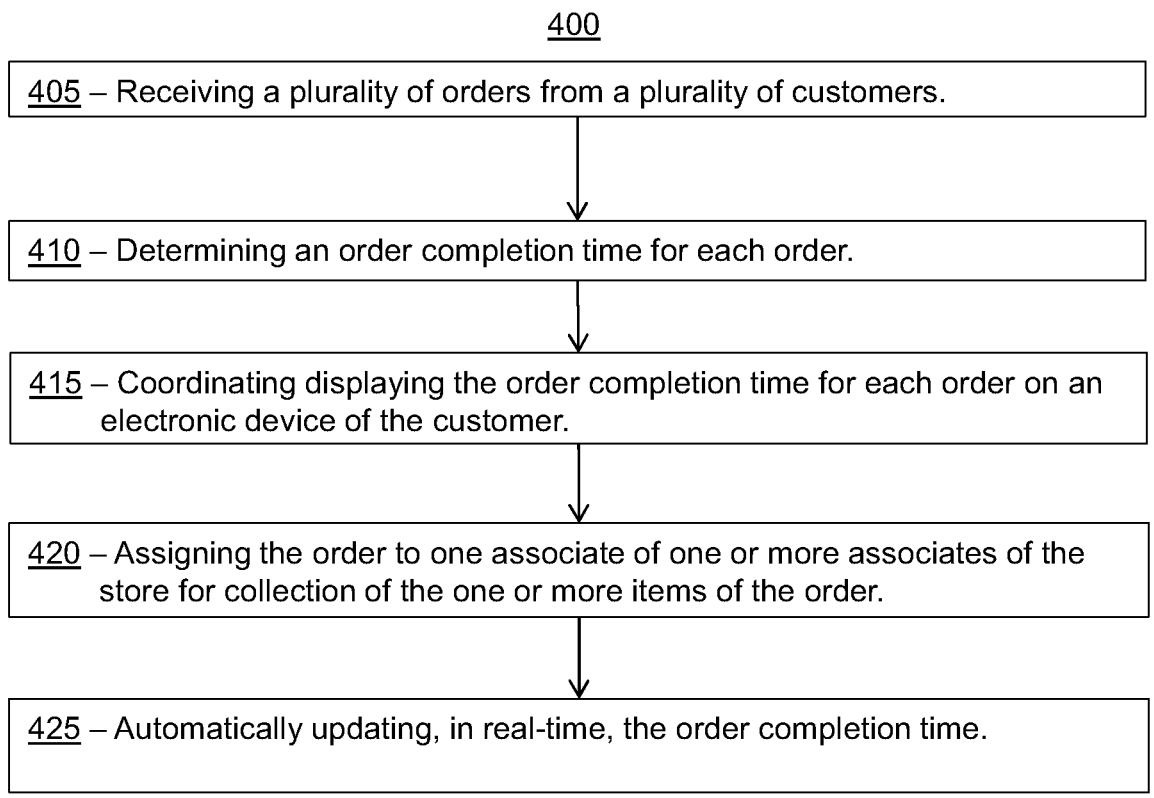
FIG. 4 is a flowchart for a method, according to additional embodiments.
Figure 5:
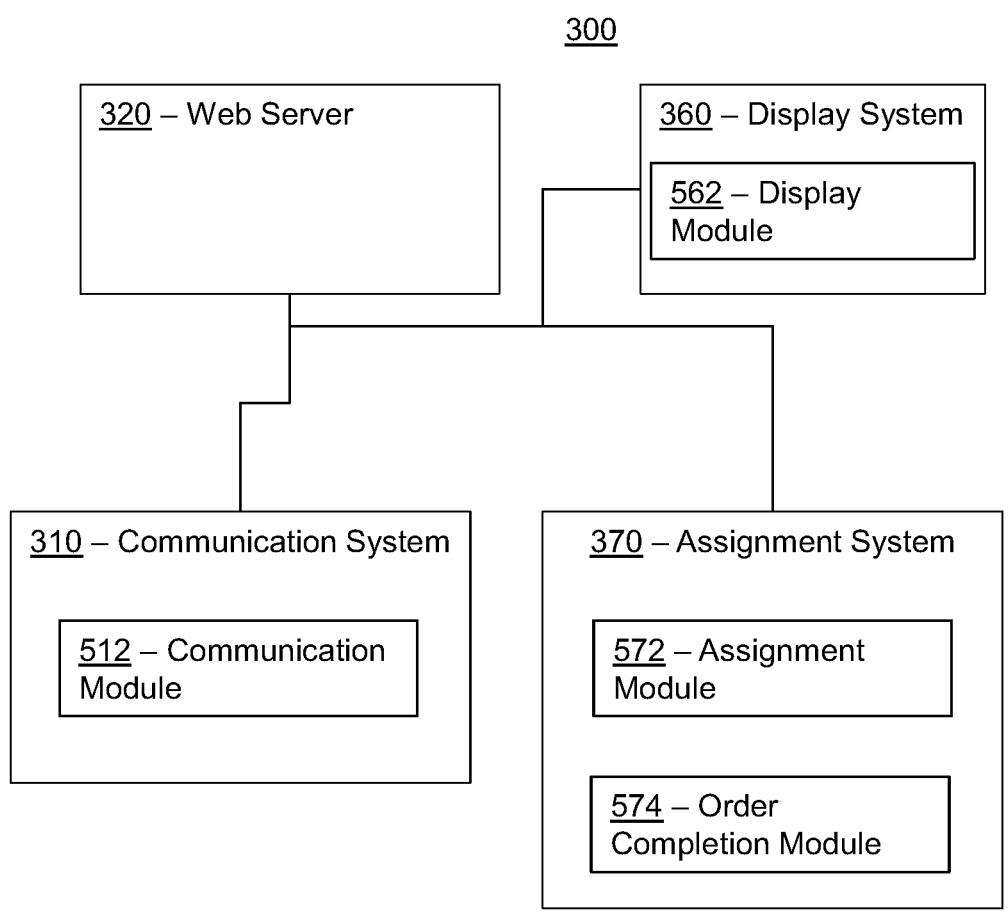
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 562, 572, and/or 574 (FIG. 5). Such non-transitory memory storage modules can be part of a computer system such as communication system 310, web server 320, display system 360, and/or assignment system 370 (FIGS. 3 & 5). The processing module(s) can be similar or identical to the processing module(s) described above with respect to computer system 100 (FIG. 1).

One or more embodiments of method 400 can be utilized to provide and update a service level agreement or order completion time for an order placed by a customer. Embodiments of method 400 also can adapt assignments for order collection and/or order completion times based on real-time changes, such as but not limited to store associates completing collection of an order earlier than expected, delays in collecting an order, and/or reassignment of an order to a different store associate.

In many embodiments, method 400 can comprise an activity 405 of receiving a plurality of orders from a plurality of customers. Each order of the plurality of orders can comprise one or more items for sale at a store. In some embodiments, the store can comprise one or more brick and mortar stores. In other embodiments, the store can comprise one or more online stores, one or more warehouses, and/or one or more distribution centers for one or more online stores, one or more brick and mortar stores, or both.

In many embodiments, each order of the plurality of orders can be received at different times from electronic devices of the plurality of customers. For example, at least a portion of the plurality of customers can place an order online using his/her electronic device. In other examples, an order may be made by the customer by calling the store and speaking with an associate or leaving a message with the order. Moreover, in some embodiments, activity 405 can comprise: (1) receiving, from a first electronic device of a first customer, a first order comprising one or more first items for sale at the store, and also (2) receiving, from a second electronic device of a second customer and after the first order is received, a second order comprising one or more second items for sale at the store. In such an embodiment, for example, the first order would be placed before the second order in a queue of orders to be collected at the store.

In various embodiments, the orders placed by customers can comprise orders for delivery or orders for pickup. For example, activity 405 can comprise receiving the plurality of orders for delivery of the one or more items of each order of the plurality of orders to the plurality of customers. In these embodiments, system 300 (FIG. 3) also can receive a delivery address for the order and/or coordinate delivery of the order by an associate of the store or third-party delivery service. In an order for delivery of the one or more items, the one or more items are collected at the store by a store associate, and then a store associate, a third-party delivery driver, a drone service, or a self-driving car delivers the one or more items to the agreed upon location for delivery.

In other embodiments, activity 405 can comprise receiving the plurality of orders for pickup at the store of the one or more items of each order by the respective customer. In an order for pickup of the one or more items, the one or more items are collected at the store by a store associate (or "picker"), and the customer goes to a predetermined location in the store or the parking lot of the store to pick up the one or more items of the order.

In some embodiments, activity 405 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location. In some embodiments, activity 405 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

In many embodiments, method 400 can further comprise an activity 410 of, for each order of the plurality of orders from each customer of the plurality of customers, determining an order completion time for the order. The order completion time can be a time at which the order is ready for pickup at the store by the customer, or can be a time at which the order should be delivered to the customer. In some embodiments, the order completion time is a window of time, such as a 15-minute window, a 30-minute window, a 1-hour window, and so on.

In some embodiments, the order completion time can be based on at least one of: (1) availabilities of one or more associates of the store to collect the one or more items of the order at the store and/or (2) a dynamic pick time estimation for the order. Thus, in some embodiments, the order completion time is not a static determination, but rather a dynamic determination that considers various real-time factors. For example, availabilities of the one or more associates of the store can be based on a total number of associates assigned to collect items for orders at the store, scheduled breaks for the associates assigned to collect items for orders at the store, and/or any currently pending or in-progress orders at the store. By way of an additional example, the order completion time for a new order can be based not only on the dynamic pick time estimation for the new order, but also the dynamic pick time estimation for any currently pending or in-progress orders at the store. Moreover, the order completion time for a new order also can be based on the availability of one or more associates to collect not only the new order but also any currently pending or in-progress orders.

The dynamic pick time estimation for the order the dynamic pick time estimation can be based on one or more of the following: (1) one or more locations of the one or more items in the store, (2) a number of commodity switches required to collect the one or more items at the store, (3) a historical performance of the associate of the store assigned to collect the one or more items of the order and/or the one or more associates available to collect the one or more items of the order, (4) a time of day when the order is collected at the store by the associate, and/or (5) whether any of the one or more items need to be refrigerated or kept frozen. The number of commodity switches can include the number of times an associate must switch between different commodities in the store to collect the one or more items. For example, a number of times a user must switch from the refrigerated or frozen section of the store to the room temperature section of the store. In some embodiments, the number commodity switches can comprise a number of isle switches of how many isle must be traversed in the store based on the item locations within commodity for an associate to collect the order.

In some embodiments, the dynamic pick time estimation can be determined using a regression analysis for estimating the relationships among variables. The regression analysis used can use the relationship between a dependent variable and one or more independent variables (or "predictors"). The regression model can determine how picking time (or the dependent variable or "criterion variable") can be modeled changes when any one of the independent variables is varied for each order. The independent variables can include, for example, a number of: (1) a total number of ambient, chilled, and/or frozen products; and/or (2) a total number of ambient, chilled, and/or frozen products.

In some embodiments, linear regression can be used where the relationships are modeled using linear predictor functions whose unknown model parameters are estimated from data. For example, given a variable y and a number of variables $X_1, \ldots, X_p$ that may be related to y, linear regression analysis can be applied to quantify the strength of the relationship between y and the $X_j$, to assess which $X_j$ may have no relationship with y at all, and to identify which subsets of the $X_j$ contain redundant information about y.

In a non-limiting example, the following was used to determine with all values of A based on historical data, and then used to estimate picking time based on order related variables:

$$\text{Estimated Picking Time} = A1X1, A2X2, A3X3, A4X4, A5X5 \ldots AnXn + \text{Constant} + \text{Error}$$

where constant is a required value for each estimation, A are coefficients, and X are order related variables that impact picking. Independent variables or order related variables that impact picking time can be determined through techniques of feature selection, and then reducing the independent variables or order related variables to the features that impacted the picking time the most. Information gain for feature selection can be used to select features that are most important to picking time and discard irrelevant or redundant features.

In some embodiments, factors considered in determining the order completion time can vary dependent upon whether the order is an order for pickup or an order for delivery. For example, if the order is an order for delivery, determining the order completion time can comprise, for each order of the plurality of orders, determining the order completion time based on: (1) the dynamic pick time estimation for the order and (2) a distance of the customer from the store. The distance of the customer from the store can include an actual road distance from the store to the location for delivery, the time of day, and/or current or forecasted traffic conditions. In some embodiments, if the order is an order for a scheduled delivery, determining the order completion time does not factor in real-time availability of store associates for collecting the one or more items at the store. In other embodiments, if the order is an order for express or on-demand delivery, determining the order completion time can factor in real-time availability of store associates for collecting the one or more items at the store. Similarly, if the order is an order for pickup, determining the order completion time can factor in real-time availability of store associates for collecting the one or more items at the store.

In many embodiments, activity 410 also can include, for each order of the plurality of orders, an activity of determining a picking start time and a picking end time for the order. The picking start time and the picking end time can be based on (1) the availabilities of the one or more associates of the store to collect the one or more items of the order at the store, and/or (2) the dynamic pick time estimation for the order.

Method 400 can further comprise an activity 415 of, for each order of the plurality of orders from each customer of the plurality of customers, coordinating displaying the order completion time for the order on an electronic device of the customer. In some embodiments, activity 415 can comprise coordinating displaying a plurality of order completion times on the electronic device of the customer, and method 400 also can comprise an activity receiving a selection of one of the plurality of order completion times from the electronic device of the customer. In these embodiments, the plurality of order completion times for an order can be determined as a plurality of possible order completion times according to activity 410, and the customer can select which order time of the plurality of order times he/she prefers.

Method 400 can further comprise an activity 420 of, for each order of the plurality of orders from each customer of the plurality of customers, assigning the order to one associate of the one or more associates of the store for collection of the one or more items of the order. Thus, activity 420 can comprise activities of assigning the first order to a first associate for collection of the one or more first items at the store, and assigning the second order to a second associate for collection of the one or more second items at the store.

Assignment of each order to certain associates of a plurality of associates at a store can be based on one or more factors. For example, system 300 (FIG. 3) can estimate or forecast, in real-time, when an associate will be available for collection of a new order based upon application of one or more of the factors described above in relation to activity 410 to each pending or in-progress order made before the new order. In some embodiments, system 300 (FIG. 3) can automatically split a single order into two or more lists for two or more different associated to collect the order simultaneously. Splitting of the order can be based on any of the factors described elsewhere in this disclosure, such as but not limited to associate availability, pick time estimation, and so on. In many embodiments, method 400 can comprise an activity of, for each order of the plurality of orders, transmitting the order to an associate electronic device of the associate assigned to collect the order. Transmitting the order to the associate electronic device can occur when the assignment of the order is initially made, and/or when the associate is available to collect the order.

In many embodiments, method 400 can further comprise an activity 425 of, for each order of the plurality of orders from each customer of the plurality of customers, automatically updating, in real-time, the order completion time. Automatically updating, in real-time, the order completion time can be based on at least one of: (1) automatically reassigning the order to a different associate of the one or more associates or (2) the one associate initially assigned the order becoming available earlier than previously estimated when determining the order completion time for the order.

For example, if the associate initially assigned to collect the order takes longer on a different order that is earlier in the order queue, takes a break, or is otherwise delayed, system 300 (FIG. 3) can automatically reassign the order to a different associate of the store associates and automatically update, in real-time, the order completion time if the order completion time has changed due to the reassignment of the order. Thus, method 400 can optionally comprise an activity of automatically reassigning the order to the different associate if the one associate initially assigned the order is delayed or unavailable for collection of the order at the originally assigned time. Activity 425 can then comprise, for each order of the plurality of orders, automatically updating, in real-time, the order completion time based on reassigning the order to the different associate.

Alternatively or additional, the associate initially assigned to collect the order may become available earlier than previously estimated when determining the order completion time, and thus may begin collecting the order earlier than expected, resulting in an earlier order completion time. Method 400 can thus optionally comprise an activity of automatically reassigning a second order or later order to a different associate than originally assigned if the different associate becomes available for collection of the one or more second items before the initially assigned associate. Activity 425 can then comprise an activity of automatically updating, in real-time, a second order completion time for the second order based on reassigning the second order from the second associate to the first associate.

In embodiments where picking start times and picking end times for each order have been determined, activity 425 can comprise, for each order of the plurality of orders, automatically adjusting the picking start time and the picking end time based on (1) reassigning the order to the different associate of the one or more associates or (2) the one associate of the one or more associates becoming available earlier than previously estimated when determining the order completion time for the order. In many embodiments, any time a change in associate availability to collect an order occurs, system 300 (FIG. 3) can automatically reassign all orders of the plurality of orders that are currently pending and adjust the picking start time and the picking end time for each order.

For example, every time any order of the plurality of orders is reassigned, system 300 (FIG. 3) can review all pending orders in system 300 (FIG. 3) and all active or available associates in system 300 (FIG. 3), and then reassign or re-queue all pending orders to the available associates with an adjusted estimated picking start time and picking end time for each order. In some embodiments, this reassignment of all pending orders can change the order completion time for one or more orders of the plurality of orders. If the order completion time is changed or updated, method 400 can optionally comprise an activity of transmitting, to the electronic device of the customer, a message comprising the order completion time as updated. In other embodiments, this reassignment of all pending orders can be accomplished without changing any order completion time for the plurality of orders or without notifying the customer of the earlier order completion time.

FIG. 5 illustrates a block diagram of a portion of system 300 comprising communication system 310, web server 320, display system 360, and assignment system 370, according to the embodiment shown in FIG. 3. Each of communication system 310, web server 320, display system 360, and assignment system 370, is merely exemplary and not limited to the embodiments presented herein. Each of communication system 310, web server 320, display system 360, and assignment system 370, can be employed in many different embodiments or examples not specifically depicted or described herein. In some embodiments, certain elements or modules of communication system 310, web server 320, display system 360, and/or assignment system 370, can perform various procedures, processes, and/or acts. In other embodiments, the procedures, processes, and/or acts can be performed by other suitable elements or modules.

In many embodiments, communication system 310 can comprise non-transitory memory storage module 512. Memory storage module 512 can be referred to as communication module 512. In many embodiments, communication module 512 can store computing instructions configured to run on one or more processing modules and perform one or more acts of method 400 (FIG. 4) (e.g., activity 405 of receiving a plurality of orders from a plurality of customers (FIG. 4)).

In many embodiments, display system 360 can comprise non-transitory memory storage module 562. Memory storage module 562 can be referred to as display module 562. In many embodiments, display module 562 can store computing instructions configured to run on one or more processing modules and perform one or more acts of method 400 (FIG. 4) (e.g., activity 415 of coordinating displaying the order completion time for each order on an electronic device of the customer (FIG. 4)).

In many embodiments, assignment system 370 can comprise non-transitory storage module 572. Memory storage module 572 can be referred to as assignment module 572. In many embodiments, assignment module 572 can store computing instructions configured to run on one or more processing modules and perform one or more acts of method 400 (FIG. 4) (e.g., activity 420 of assigning the order to one associate of the one or more associates of the store for collection of the one or more items of the order (FIG. 4)).

In many embodiments, assignment system 370 can comprise non-transitory storage module 574. Memory storage module 574 can be referred to as order completion module. In many embodiments, order completion module 574 can store computing instructions configured to run on one or more processing modules and perform one or more acts of method 400 (FIG. 4) (e.g., activity 410 of determining an order completion time for each order, and activity 425 of automatically updating, in real-time, the order completion time (FIG. 4)).

Although systems and methods for real-time order delay management have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory storage devices storing computing instructions configured to run on the one or more processors and perform:
receiving a plurality of orders from a plurality of customers, each respective order of the plurality of orders comprising one or more respective items for sale at a store; and
for each respective order of the plurality of orders from each respective customer of the plurality of customers:
determining a respective order completion time for each respective associate of one or more respective associates of the store based on at least one of:
(1) respective availabilities of the one or more respective associates of the store to collect the one or more respective items of the respective order at the store; and
(2) a respective dynamic pick time estimation for the respective order as determined by a regression analysis performed on respective historical picking data for available associates of the one or more respective associates;
causing an electronic device of the respective customer to display the respective order completion time;
assigning the respective order to one associate of the one or more respective associates of the store for collection of the one or more respective items of the respective order at the store; and
automatically updating, in real-time, the respective order completion time based on at least one of:
(1) automatically reassigning the respective order to a different associate of the one or more respective associates; or
(2) the one associate of the one or more respective associates becoming available earlier than previously estimated when determining the respective order completion time for the respective order.

2. The system of claim 1, wherein:
receiving the plurality of orders from the plurality of customers comprises:
receiving, from a first electronic device of a first customer, a first order comprising one or more first items for sale at the store; and
receiving, from a second electronic device of a second customer and after the first order is received, a second order comprising one or more second items for sale at the store;
assigning the respective order to the one associate of the one or more respective associates comprises:
assigning the first order to a first associate of the one or more respective associates of the store for collection of the one or more first items at the store; and
assigning the second order to a second associate of the one or more respective associates of the store for collection of the one or more second items at the store;

the one or more non-transitory storage devices storing the computing instructions are further configured to run on the one or more processors and perform:
automatically reassigning the second order to the first associate when the first associate becomes available for collection of the one or more second items before the second associate; and
automatically updating, in real-time, the respective order completion time comprises automatically updating, in real-time, a second order completion time for the second order based on the automatic reassigning of the second order from the second associate to the first associate.

3. The system of claim 1, wherein:
the one or more non-transitory storage devices storing the computing instructions are further configured to run on the one or more processors and perform:
for each respective order of the plurality of orders, automatically reassigning the respective order to one or more respective different associates when the one associate is delayed or unavailable for collection of the respective order; and
automatically updating, in real-time, the respective order completion time comprises, for each respective order of the plurality of orders, automatically updating, in real-time, the respective order completion time based on the automatic reassigning of the respective order to the one or more respective different associates.

4. The system of claim 1, wherein the one or more non-transitory storage devices storing the computing instructions are further configured to run on the one or more processors and perform:
automatically transmitting, to the electronic device of the respective customer, a message comprising the respective order completion time, as updated.

5. The system of claim 1, wherein:
receiving the plurality of orders from the plurality of customers comprises receiving the plurality of orders for delivery of the one or more respective items of each respective order of the plurality of orders to the plurality of customers;
determining the respective order completion time comprises, for each respective order of the plurality of orders, determining the respective order completion time based on:
(1) the respective dynamic pick time estimation, as determined, for the respective order; and
(2) a respective distance of the respective customer from the store; and
the store comprises a brick and mortar store.

6. The system of claim 1, wherein:
receiving the plurality of orders from the plurality of customers comprises receiving the plurality of orders for pickup of the one or more respective items of each respective order of the plurality of orders by the plurality of customers at the store;
determining the respective order completion time comprises, for each respective order of the plurality of orders, determining the respective order completion time based on:
(1) the respective availabilities of the one or more respective associates of the store to collect the one or more respective items of the respective order at the store; and
(2) the respective dynamic pick time estimation, as determined, for the respective order; and
the store comprises a brick and mortar store.

7. The system of claim 1, wherein:
the one or more non-transitory storage devices storing the computing instructions are further configured to run on the one or more processors and perform:
for each respective order of the plurality of orders, determining a respective picking start time and a respective picking end time based on:
(1) the respective availabilities of the one or more respective associates of the store to collect the one or more respective items of the respective order at the store; or
(2) the respective dynamic pick time estimation, as determined, for the respective order; and
automatically updating, in real-time, the respective order completion time comprises, for each respective order of the plurality of orders, automatically adjusting the respective picking start time and the respective picking end time based on:
(1) the automatic reassigning of the respective order to the different associate of the one or more respective associates; or
(2) the one associate of the one or more respective associates becoming available earlier than previously estimated when determining the respective order completion time for the respective order.

8. The system of claim 1, wherein the one or more non-transitory storage devices storing the computing instructions are further configured to run on the one or more processors and perform:
for each respective order of the plurality of orders, transmitting the respective order to an associate electronic device of the one associate of the one or more respective associates.

9. The system of claim 1, wherein the regression analysis comprises:
determining, using the respective historical picking data for available associates of the one or more respective associates:
respective coefficients of each respective independent variable effecting the respective order completion time;
a constant applicable to the respective historical picking data of each respective associate; and
an error term.

10. The system of claim 1, wherein assigning the respective order to the one associate of the one or more respective associates comprises:
splitting the collection of the one or more respective items of the respective order between two or more associates of the one or more respective associates when at least one additional associate of the one or more respective associates becomes available, wherein the two or more associates comprise the one additional associate and the different associate.

11. A method comprising:
receiving a plurality of orders from a plurality of customers, each respective order of the plurality of orders comprising one or more respective items for sale at a store; and
for each respective order of the plurality of orders from each respective customer of the plurality of customers:
determining a respective order completion time for each respective associate of one or more respective associates of the store based on at least one of:
(1) respective availabilities of the one or more respective associates of the store to collect the one or more respective items of the respective order at the store; and
(2) a respective dynamic pick time estimation for the respective order as determined by a regression analysis performed on respective historical picking data for available associates of the one or more respective associates;
causing an electronic device of the respective customer to display the respective order completion time;
assigning the respective order to one associate of the one or more respective associates of the store for collection of the one or more respective items of the respective order at the store; and
automatically updating, in real-time, the respective order completion time based on at least one of: (1) automatically reassigning the respective order to a different associate of the one or more respective associates or (2) the one associate of the one or more respective associates becoming available earlier than previously estimated when determining the respective order completion time for the respective order.

12. The method of claim 11, wherein:
receiving the plurality of orders from the plurality of customers comprises:
receiving, from a first electronic device of a first customer, a first order comprising one or more first items for sale at the store; and
receiving, from a second electronic device of a second customer and after the first order is received, a second order comprising one or more second items for sale at the store;
assigning the respective order to the one associate of the one or more respective associates comprises:
assigning the first order to a first associate of the one or more respective associates of the store for collection of the one or more first items at the store; and
assigning the second order to a second associate of the one or more respective associates of the store for collection of the one or more second items at the store;
the method further comprises automatically reassigning the second order to the first associate when the first associate becomes available for collection of the one or more second items before the second associate; and
automatically updating, in real-time, the respective order completion time comprises automatically updating, in real-time, a second order completion time for the second order based on the automatic reassigning of the second order from the second associate to the first associate.

13. The method of claim 11, wherein:
the method further comprises, for each respective order of the plurality of orders, automatically reassigning the respective order to one or more respective different associates when the one associate is delayed or unavailable for collection of the respective order; and
automatically updating, in real-time, the respective order completion time comprises, for each respective order of the plurality of orders, automatically updating, in real-time, the respective order completion time based on the automatic reassigning of the respective order to the one or more respective different associates.

14. The method of claim 11, further comprising:
automatically transmitting, to the electronic device of the respective customer, a message comprising the respective order completion time as updated.

15. The method of claim 11, wherein:
receiving the plurality of orders from the plurality of customers comprises receiving the plurality of orders for delivery of the one or more respective items of each respective order of the plurality of orders to the plurality of customers;
determining the respective order completion time comprises, for each respective order of the plurality of orders, determining the respective order completion time based on:
(1) the respective dynamic pick time estimation, as determined, for the respective order; and
(2) a respective distance of the respective customer from the store; and
the store comprises a brick and mortar store.

16. The method of claim 11, wherein:
receiving the plurality of orders from the plurality of customers comprises receiving the plurality of orders for pickup of the one or more respective items of each respective order of the plurality of orders by the plurality of customers at the store;
determining the respective order completion time comprises, for each respective order of the plurality of orders, determining the respective order completion time based on:
(1) the respective availabilities of the one or more respective associates of the store to collect the one or more respective items of the respective order at the store; and
(2) the respective dynamic pick time estimation, as determined, for the respective order; and
the store comprises a brick and mortar store.

17. The method of claim 11, wherein:
the method further comprises, for each respective order of the plurality of orders:
determining a respective picking start time and a respective picking end time based on:
(1) the respective availabilities of the one or more respective associates of the store to collect the one or more respective items of the respective order at the store; or
(2) the respective dynamic pick time estimation, as determined, for the respective order; and
automatically updating, in real-time, the respective order completion time comprises, for each respective order of the plurality of orders, automatically adjusting the respective picking start time and the respective picking end time based on:
(1) the automatic reassigning of the respective order to the different associate of the one or more respective associates; or
(2) the one associate of the one or more respective associates becoming available earlier than previously estimated when determining the respective order completion time for the respective order.

18. The method of claim 11, further comprising, for each respective order of the plurality of orders, transmitting the respective order to an associate electronic device of the one associate of the one or more respective associates.

19. The method of claim 11, wherein the regression analysis comprises:
determining, using the respective historical picking data for available associates of the one or more respective associates:
respective coefficients of each respective independent variable effecting the respective order completion time;
a constant applicable to the respective historical picking data of each respective associate; and
an error term.

20. The method of claim 11, wherein assigning the respective order to one associate of the one or more respective associates comprises:
splitting the collection of the one or more respective items of the respective order between two or more associates of the one or more respective associates when at least one additional associate of the one or more respective associates becomes available, wherein the two or more associates comprise the one additional associate and the different associate.

* * * * *